Jan. 13, 1959  
J. F. HENKEL  
2,868,064  
MOVING PICTURE CAMERA FOR PHOTOGRAPHING  
TWO OBJECTS SIMULTANEOUSLY  
Filed April 29, 1953  
5 Sheets-Sheet 1

Inventor  
JOSEPH F. HENKEL  
Attorney

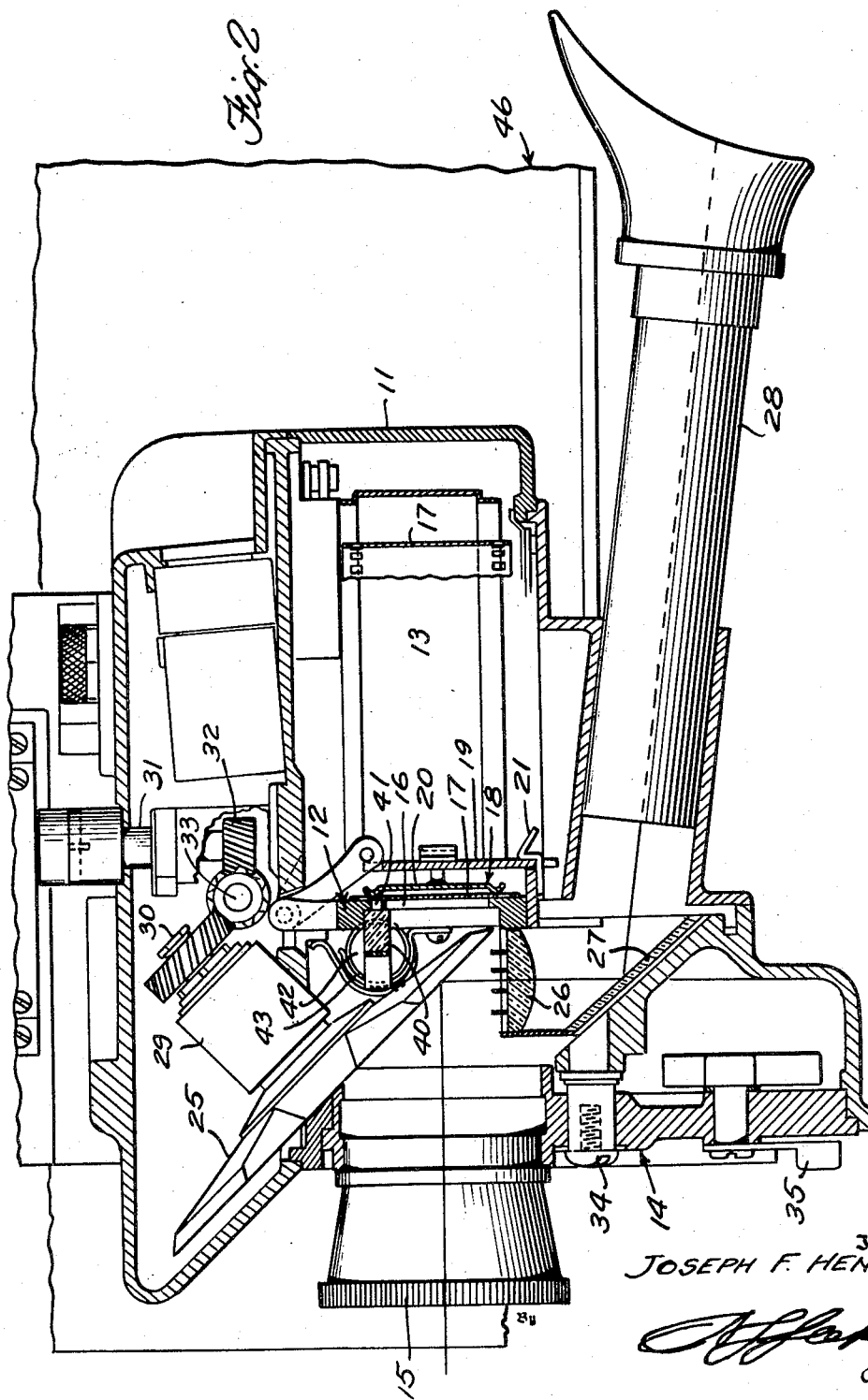

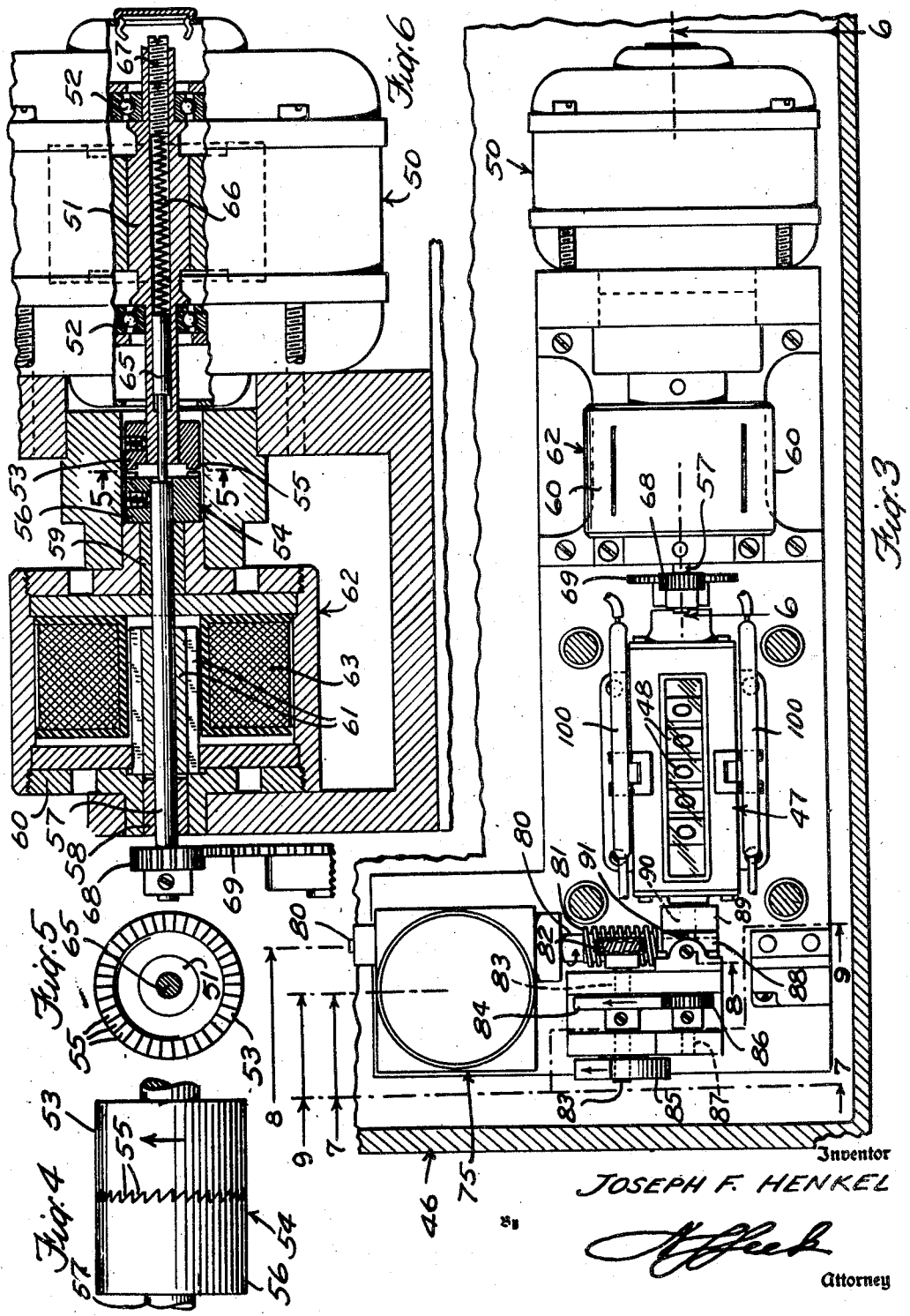
Jan. 13, 1959  J. F. HENKEL  2,868,064
MOVING PICTURE CAMERA FOR PHOTOGRAPHING
TWO OBJECTS SIMULTANEOUSLY
Filed April 29, 1953  5 Sheets-Sheet 3
Inventor
JOSEPH F. HENKEL
Attorney

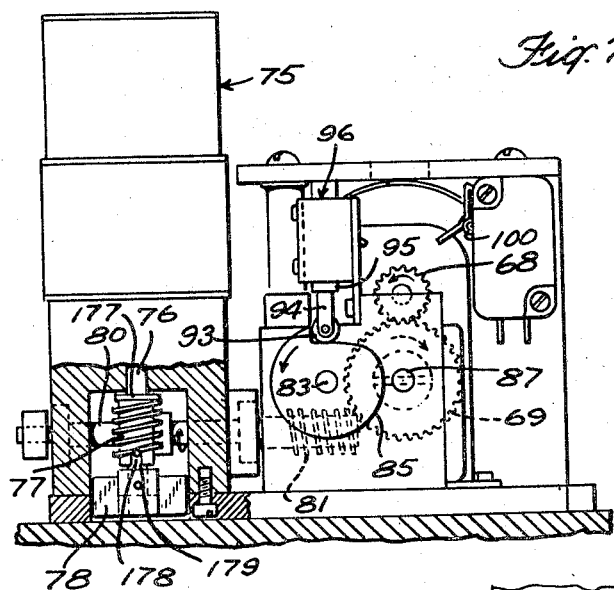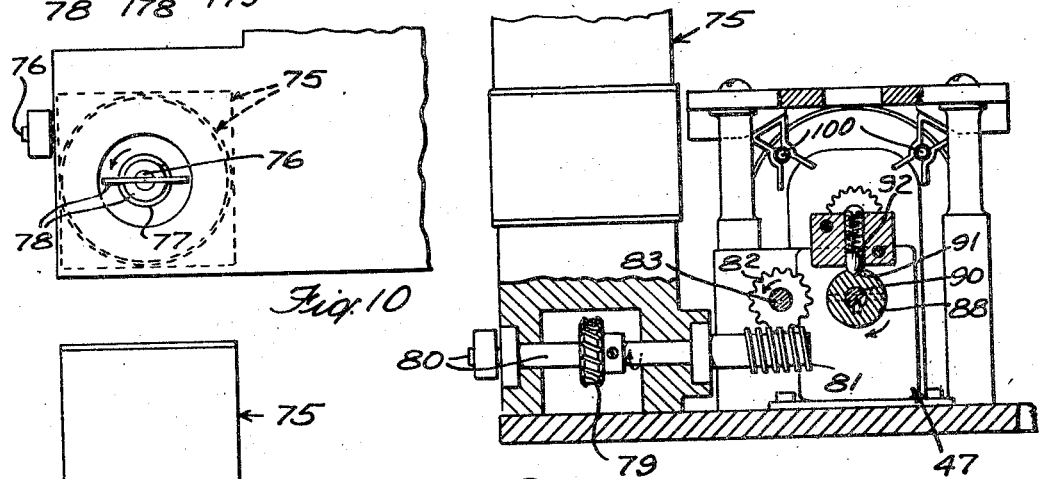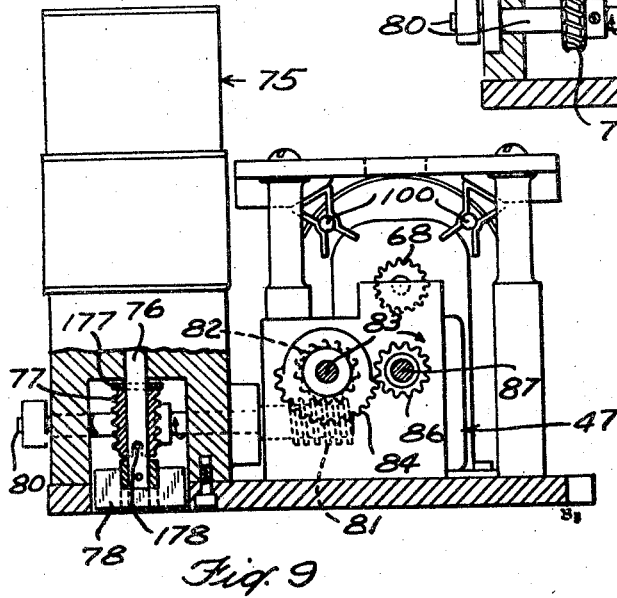

Jan. 13, 1959　　　　J. F. HENKEL　　　2,868,064
MOVING PICTURE CAMERA FOR PHOTOGRAPHING
TWO OBJECTS SIMULTANEOUSLY
Filed April 29, 1953　　　　　　　5 Sheets-Sheet 5
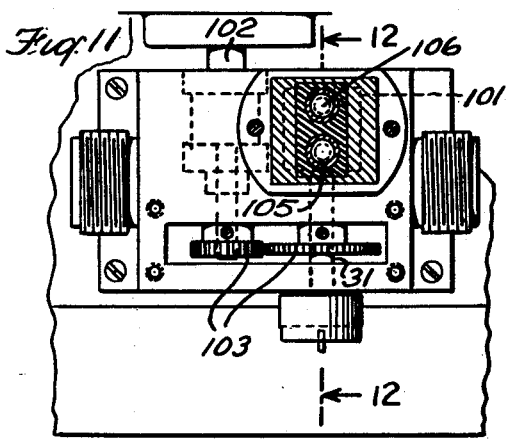
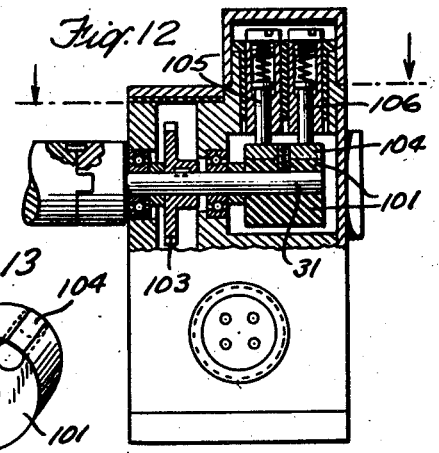
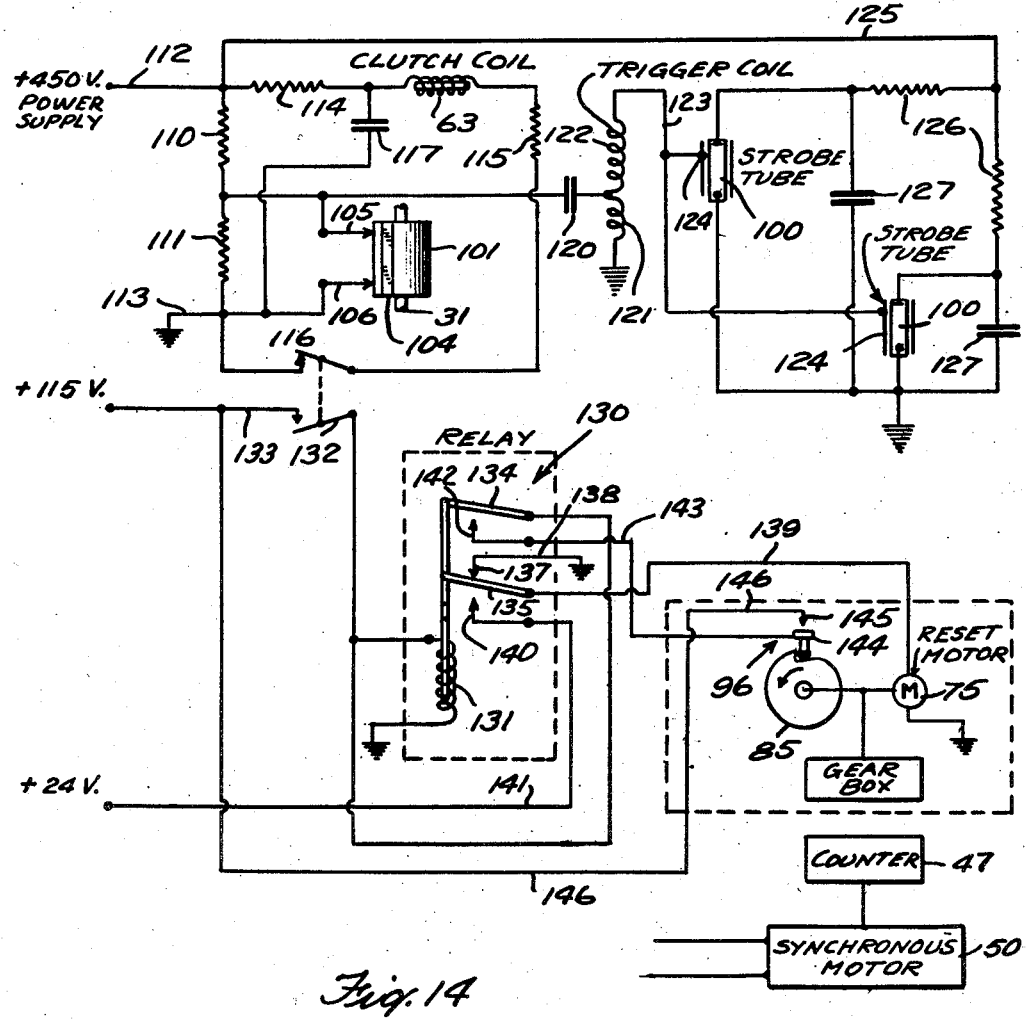

United States Patent Office 2,868,064
Patented Jan. 13, 1959

2,868,064

MOVING PICTURE CAMERA FOR PHOTOGRAPHING TWO OBJECTS SIMULTANEOUSLY

Joseph F. Henkel, Sunnyside, N. Y., assignor to Cameraflex Corporation, New York, N. Y., a corporation of New York Application April 29, 1953, Serial No. 351,783

4 Claims. (Cl. 88—16)

This invention relates to motion picture cameras and more particularly to a camera having means to photograph a second image on the film in the position normally occupied by the sound track.

An object is to provide means independent of the shutter for photographing the second image onto the emulsion side of the film.

Another object is to provide an optical path for the second image which is independent of the shutter opening.

Another object is to provide a timed counter which is driven selectively for indicating the timing of the various frames.

Another object is to provide, in connection with such a counter, a quick acting clutching mechanism for connecting said counter to a driving source in a matter of milliseconds.

Another object is to provide a reset mechanism for the counter having novel and improved characteristics.

Another object is to provide an optical system for photographing an image of the counter on the sound track area of the film to indicate the exact timing of each frame.

Another object is to provide such a system in a reflex camera having an angle shutter wherein an optical prism for the second optical system is located in the space in back of the shutter.

Various other objects and advantages will be apparent as the nature of the invention is more fully disclosed.

The novel features which are characteristics of this invention will be better understood by referring to the following description, taken in connection with the accompanying drawings, in which a specific embodiment thereof has been set forth for purposes of illustration.

In the drawings:

Fig. 2 is a horizontal section taken along the line 2—2 of Fig. 1;

Fig. 3 is a plan view of the counter and the counter driving and reset mechanism;

Fig. 4 is a side elevation of the clutch for the counter drive;

Fig. 5 is a section taken on the line 5—5 of Fig. 6, but on an enlarged scale;

Fig. 6 is a longitudinal section taken on the line 6—6 of Fig. 3, but on a larger scale showing the construction of the quick acting clutch mechanism;

Figure 1:
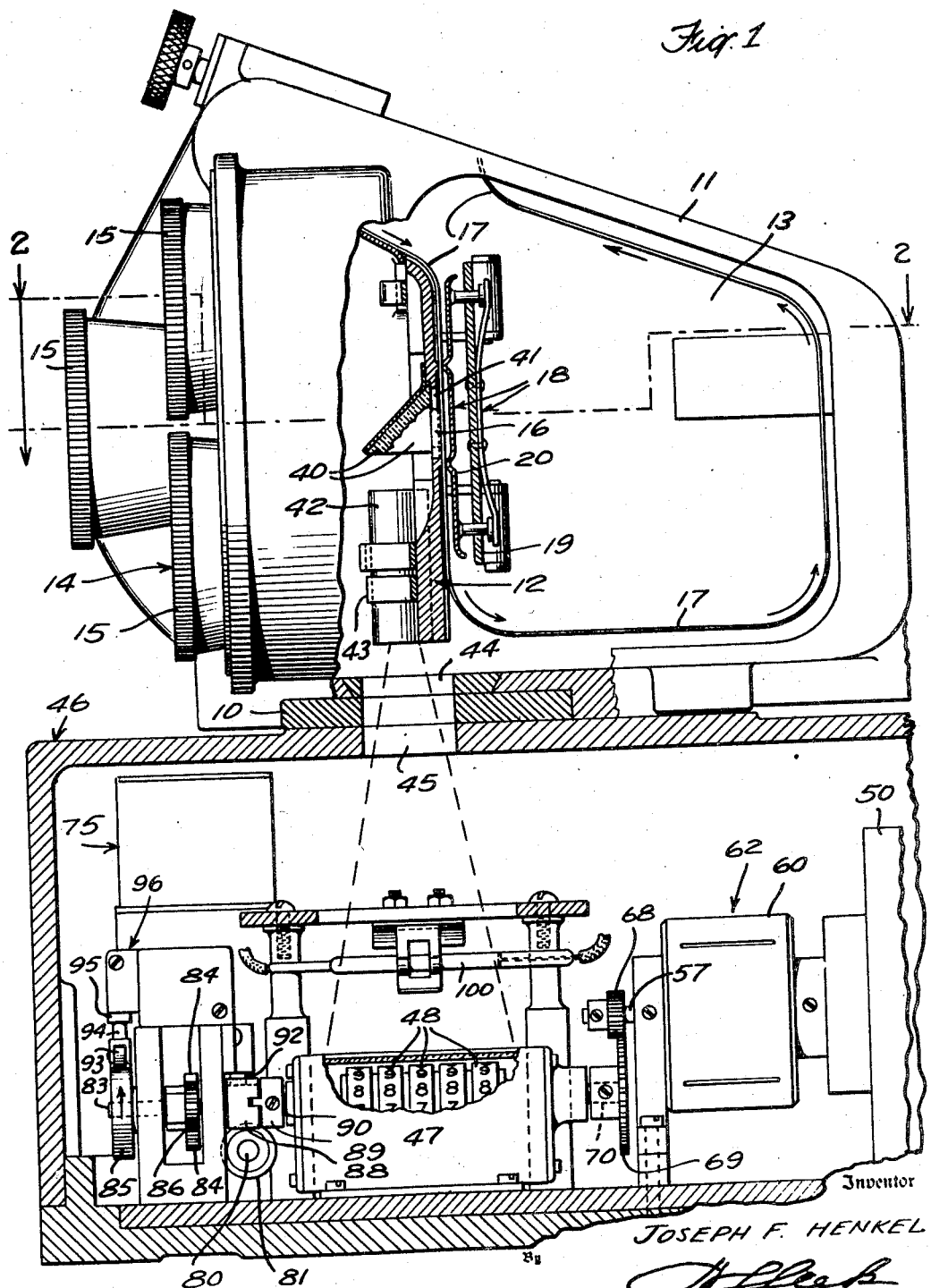
Fig. 1 is a side elevation of the camera and the counter which is to be photographed onto the sound track area of the film, with parts broken away to show the construction thereof.

Figs. 7, 8 and 9 are sections taken along the lines 7—7, 8—8 and 9—9 of Fig. 3 showing details of the reset drive;

Fig. 10 is a detail of a portion of the reset drive shown in Fig. 7;

Fig. 11 is a detail of the commutator drive through which the camera is driven;

Fig. 12 is a section taken along the lines 12—12 of Fig. 11;

Fig. 13 is a detail of the commutator; and

Fig. 14 is a schematic diagram illustrating the electrical circuits.

Referring to the drawings more in detail, the invention is shown as embodied in a camera of the reflex type having a base 10 carrying a housing 11 including an aperture plate 12, film magazine 13, and lens turret 14, all of standard construction. The lens turret carries three lenses 15 of different focal lengths which are adapted to be brought selectively in registration with the picture aperture 16 in the aperture plate 12 as required.

A film 17 is guided over the aperture plate 12 by means of a film gate 18 including a support 19, hinged to the aperture plate 12 and carrying a presser plate 20. The support 19 is secured to the aperture plate by latch 21.

The camera is provided with a rotating shutter 25 (Fig. 2) which is mounted for rotation about an axis inclined 45° to the optical axis and having a mirrored front surface to reflect the light from the lens 15, 90° laterally onto a lens 26 and a mirror 27 which reflects the light through a little more than 90° into the sighting telescope 28. The shutter may be adjustable as to the opening in accordance with usual practice. For example the shutter may include a pair of rotating discs which are adjustable with respect to each other for varying the shutter opening. In the form shown the shutter 25 is mounted on a shaft 30 for rotation in a bearing 29 and is driven from a drive shaft 31 through a pair of spiral gears 32 and an intermediate shaft 33 providing a 2:1 reduction. In this case the shutter has two openings so that two frames are exposed per revolution. The lens turret 14 is shown as mounted for rotation about a pin 34 and as having latching members 35 to secure the selected lens.

It is to be understood that the camera thus far described is of standard construction and only so much thereof has been illustrated as is necessary to an understanding of this invention.

In accordance with this invention a roof prism 40 is mounted in front of the sound aperture 41 of the aperture plate 12 in the triangular space in back of the angle shutter 25. A telescope 42 (Figs. 1 and 2) is mounted on the front of the aperture plate 12, by a clip 43, in optical alignment with the prism 40.

The telescope 42 registers with an opening 44 in the base 10 and with a corresponding opening 45 in a casing 46 on which the base 10 is mounted. A counter 47, of usual construction, having index wheels 48 is mounted in the casing 46 in alignment with the openings 44 and 45 so that the image of the index wheels 48 is projected by the telescope 42 and the roof prism 40, through the sound aperture 41, onto the sound track area of the film 17.

The counter 471 is driven by a synchronous motor 50 (Figs. 2–6) having a hollow shaft 51 mounted in bearings 52. The shaft 51 carries one member 53 of a clutch 54 having saw tooth teeth 55. The other member 56 of the clutch, having mating teeth, is carried on a sliding shaft 57 mounted for rotary and sliding movements in bearings 58 and 59 in a housing 60. The shaft 57 carries a slotted sleeve 61 of magnetic material which constitutes the core of a solenoid 62 having an exciting winding 63 contained within the housing 60 and so arranged that energization of the solenoid causes the sleeve 61, and shaft 57, to shift axially to the right as seen in Fig. 6 to engage the clutch. The shaft 57 is held in disengaged position by a pin 65 projecting from the end of the hollow shaft 51 and held extended by a spring 66 held by a set screw 67 in the shaft 51.

The shaft 57 carries a spur gear 68 meshing with a spur gear 69 on the counter shaft 70. The gear 68 is of a width to allow axial movement thereof in response to action of the solenoid 62, while still remaining in mesh with the gear 69.

If the synchronous motor 50 operates at 1800 R. P. M. and the gears 68 and 69 provide a 3:1 reduction, then the shaft 70 will be driven at 600 R. P. M. or 10 revolutions per second. Assuming that the right hand index wheel 48 is mounted on the shaft 70, then the number thereon will indicate hundredths of a second, counting from the starting time when the clutch is engaged. The solenoid 62 is made extremely quick acting, as will be described in connection with Fig. 14 and is adapted to engage the clutch within the travel of a single tooth, so that the counter is accurate to a hundredth of a second from the time of closing the solenoid switch.

The reset mechanism is shown in Figs. 3 and 7 to 10 as driven from a motor 75 having a vertical shaft 76 carrying a worm 77 and an air vane 78 to constitute an air brake to prevent the motor from running at excessive speed when not under the load of the reset mechanism and to assist in bringing the motor to a quick stop. Mounted on the shaft 76 is a brake washer 177 interposed between the motor housing and the upper end of the worm 77. A pin and slot connection 178 and 179 provides endwise movement of the worm upwardly on shaft 76. In operation, when the circuit of the reset motor 75 is broken the inertia of the shaft 76 and associated parts continue to rotate in the direction of the arrow shown on shaft 76 (Fig. 9), in which case the worm 77 through brake washer 177 engages the motor housing of motor 75, and rotation is stopped. The worm 77 drives a worm gear 79 on a horizontal shaft 80 carrying a worm 81 driving a worm gear 82 on a cross shaft 83. The shaft 83 carries a mutilated gear 84 (Fig. 9) and a cam 85 (Fig. 7). The mutilated gear 84 drives a gear 86 on a shaft 87 carrying a positioning cam 88 and coupled by a universal coupling 89 to the reset shaft 90 of the counter.

The mutilated gear 84 is provided with teeth around half of its periphery and is adapted to cause one turn of the gear 86 for each turn of the mutilated gear. The remaining half of the periphery of the gear 84 provides a time delay to allow the drive clutch to become disengaged before the gear 86 is engaged. The counter is so designed that one turn of the shaft 90 resets the counter to zero. The positioning cam 88 is provided with a notch 91 engaged by a spring pressed pin 92 (Fig. 8) to hold the counter in zero position until it is again driven by the turning of the shaft 70.

The cam 85 is engaged by a cam follower 93 (Fig. 7) carried on a plunger 94 sliding in bearing 95 and adapted, when raised, to close a microswitch 96. The cam 85 is shaped to have a sharp drop-off so that the follower drops and opens the switch at the end of a revolution of the shaft 83 when the counter has been reset to zero.

A pair of stroboscopic tubes 100 are mounted in the casing 46 in a position to illuminate the face of the counter 47. These tubes are flashed by a commutator 101 (Figs. 11 to 13). The commutator 101 is mounted on the shaft 31 which is driven from drive shaft 102 through spur gears 103. The commutator includes a conducting strip 104 engaging a pair of spring-pressed brushes 105 and 106 to complete a circuit therebetween at each revolution of the commutator. Since the commutator actuates at double the shutter speed the tubes 100 are flashed at each shutter opening.

Referring to the wiring diagram, Fig. 14, a pair of resistors 110 and 111 are connected in series across 450 volt terminals 112 and 113. The high voltage side of the resistor 110 is connected through a resistor 114 to the solenoid coil 63, thence through a resistor 115 and counter switch 116 in series to the terminal 113. A large condenser 117, for example one mf. is connected from the high voltage side of the coil 63 to the return line to the terminal 113.

The switch 116 is the starting switch for the counter. When this switch is open the condenser 117 is charged from the 450 volt line through the resistor 114. When the switch 116 is closed the condenser 117 discharges rapidly through the coil 63 and resistor 115. This current surges through the coil and causes the solenoid to act practically instantaneously to engage the clutch. By providing a large coil and setting the clutch to have a minimum clearance when open, the closing can be made to take place within the space of one tooth on the clutch elements, which is of the order of a thousandth of a second. After the condenser is discharged the solenoid remains energized from the 450 volt line through the resistor 114 which is designed to cut the voltage down to that required for energizing the solenoid. The clutch thus remains engaged, and the counter operating, as long as the switch 116 is held closed. When the switch 116 is opened and the solenoid deenergized the clutch 54 is disengaged by the spring 66.

The junction of the resistors 110 and 111 is connected through a condenser 120 to a coil 121 which is grounded and through a coil 122 and leads 123 to the starting electrodes 124 of tubes 100. The tubes 100 are energized from the 450 volt line through a lead 125 and resistors 126. Condensers 127 are connected across the respective tubes 100 as in usual stroboscope practice to facilitate their flashing. The commutator brushes 105 and 106 are connected across the resistor 111 so that the condenser 120 discharges through the coil 121 when the brushes 105 and 106 engage the conducting strip 104. Rapid discharge of the condenser 120 induces a high voltage on the starting electrodes 124 which causes the tubes 100 to fire due to the discharge of the condensers 127. The tubes thus produce a short bright flash the duration and intensity of which is determined by the constants of the circuit elements. Between flashes the condenser 120 is charged through the resistor 111.

The connection is such that the tubes 100 are flashed at each rotation of the commutator. Since the commutator is driven in synchronism with the shutter openings, the tubes 100 are flashed at each picture frame so that the numbers appearing on the face of the counter are photographed on the sound track area opposite each frame.

The reset operation is controlled by a relay 130 having an operating coil 131 which is connected through a reset switch 132 to a 115 volt line 133. The reset switch may be ganged with the counter control switch 116 so that the counter switch must be opened whenever the reset switch is closed.

The coil 131 actuates a pair of switch arms 134 and 135. With the arm 135 in raised position as shown the arm 135 engages contact 137 which is connected by a line 138 to ground. The arm 135 is connected by a line 139 to one side of the reset motor 75, the other side of which is grounded. Hence the reset motor is short circuited to ground when the relay 130 is deenergized. When the relay is energized the arm 135 engages contact 140 which is connected by line 141 to a 24 volt source for actuating the reset motor 75.

A holding circuit is provided for a relay coil 131 by arm 134 which when in lower position engages contact 142 which is connected by line 143 to the arm 144 bf the micro-switch 96, the contact 145 of which is connected by a line 146 to the 115 volt line. It will be noted that closing of the reset switch 132 serves to energize the coil 131 to actuate the relay 130 which by closing of the switch contact 140 starts the reset motor 75. As soon as the motor 75 has turned the cam 85 sufficiently to close the contact 145 a holding circuit for the coil 131 is established through the contacts 142 and 145. It now the reset switch is released the relay 130 will remain energized until the cam 85 turns to drop-off point, thereby opening the contact 145 which releases the relay coil 131 and trips the relay to stop the reset motor 75. When the relay 130 is released the motor 75 is brought to a quick stop by the electrical effect of the short circuited winding (through contact 137) and by the air brake 78. Any tendency of the reset mechanism to overrun due to its inertia then causes worm 77 to press against the brake washer 177 and thus introduce a further delay on the rotating parts to bring the cam 85 quickly to rest. The cam 85 thus makes a complete revolution of each operation of the reset motor.

In the operation of this device the camera is operated in the usual way to photograph images on the film 17. During the time between shutter openings the image is reflected from the surfaces of the shutter and is visible in the sighting telescope 28.

When the camera is operating the commutator 101 is driven in synchronism with the shutters 25 to flash lights 100 once during each frame, thereby illuminating the face of the counter 47 and causing the image thereof to be projected through the optical system, including the telescope 42 and roof prism 40 onto the sound track area of the film 17, so as to register the reading of the counter at each picture frame. The counter is started by closing the counter switch 116 which thereby energizes the clutch coil 63 and causes the clutch members 53 and 56 to be brought into engagement.

The quick action of the clutch coil, due to the discharge of the condenser 117, causes the clutch to be engaged within the space of one tooth which in the embodiment shown in which the clutch has 36 teeth is a matter of a thousandth of a second. Thus the counter is started with an accuracy far greater than 1/100 of a second and since the counter is operated at a rate to register 100ths of a second, the image which is photographed on the sound track area of the film opposite each picture frame indicates the time of the picture to a hundreth of a second.

In the case of a plurality of cameras which are to be synchronized this system permits the synchronizing of the films with an error of less than a 100th of a second.

At the end of the sequence the system also provides a remote control reset mechanism which, by reason of the circuit shown in Fig. 14 and described above, the reset shaft 83 of the counter is caused to make one complete revolution and stop accurately at each acuation of the reset switch. When the shaft has made a complete revolution the counter is held accurately in zero position by the positioning cam 88.

It is to be noted that the system for photographing the second image on the emulsion side of the film is independent of shutter opening since the optical path is disposed entirely behind the shutter.

While this has been shown as designed to photograph the face of a counter, it is to be understood that it may be adapted for other purposes and that other objects may be photographed directly onto the sound track area of the film.

The system has been shown as applied to a camera of the reflex type because the angle shutter of the reflex camera provides space for the optical system between the shutter and the film. It may of course be applied to other types of cameras provided there is sufficient space available for the optical system without requiring passage of the light through the shutter.

What is claimed is:

1. In a motion picture camera having an aperture plate with a picture aperture and a sound aperture therein through which light is passed to adjacent areas of a film, a rotating shutter disposed in front of said aperture plate and disposed at an angle thereto, a prism on said aperture plate in registration with the sound aperture therein, a lens system mounted on said aperture plate in the space provided between the aperture plate and the angle shutter to direct light onto said prism for reflection thereby through said sound aperture onto said film, a base carrying said camera, a housing carrying said base, a counter disposed in said housing, means including an opening in said housing registering with said lens system projecting an image of said counter onto said film for photographing on the sound track area of said film, a strobe light in said casing to illuminate said counter for the above purpose, means including an energizing circuit and a commutator connected to flash said strobe light, a drive shaft for said shutter, and gears connecting said commutator to rotate in synchronism with said drive shaft for flashing said strobe light at the time of each shutter opening.

2. The invention set forth in claim 1 including a synchronous drive for said counter driving the counter to register fractions of a second.

3. The invention set forth in claim 2 including a quick acting clutch connecting said synchronous drive to said counter for causing said counter to indicate units of time counted from a given starting time.

4. The invention set forth in claim 3 including a remote controlled reset mechanism connected to reset said counter to zero and means preventing actuation of said reset mechanism when said clutch is driving said counter.

References Cited in the file of this patent

UNITED STATES PATENTS

| | | |
|---|---|---|
| 946,215 | Geissinger | Jan. 11, 1910 |
| 1,455,491 | Huet | May 15, 1923 |
| 1,672,882 | Dudley | June 12, 1928 |
| 1,810,002 | Arnold | June 16, 1931 |
| 1,915,566 | Younghusband | June 27, 1933 |
| 1,948,319 | Spence | Feb. 20, 1934 |
| 2,012,352 | Rusting et al. | Aug. 27, 1935 |
| 2,045,414 | Rumpel | June 23, 1936 |
| 2,169,011 | Wengel | Aug. 8, 1939 |
| 2,180,412 | Hart | Nov. 21, 1939 |
| 2,249,488 | Nickle | July 15, 1941 |
| 2,382,765 | Zahodiakin | Aug. 14, 1945 |
| 2,385,397 | Blackburn | Sept. 25, 1945 |
| 2,440,665 | Jeffrey | Apr. 27, 1948 |
| 2,564,453 | Steiner | Aug. 14, 1951 |